(12) United States Patent
Goh

(10) Patent No.: US 6,329,762 B1
(45) Date of Patent: Dec. 11, 2001

(54) DISCHARGE LAMP DRIVER CIRCUIT

(75) Inventor: George Goh, West Sussex (GB)

(73) Assignee: Zetex, PLC (GB)

( * ) Notice: Subject to any disclaimer, the term of this patent is extended or adjusted under 35 U.S.C. 154(b) by 0 days.

(21) Appl. No.: 09/544,380

(22) Filed: Apr. 6, 2000

(30) Foreign Application Priority Data

Apr. 6, 1999 (GB) .................................................. 9907603

(51) Int. Cl.[7] .................................................. H05B 37/02
(52) U.S. Cl. .......................... 315/224; 315/291; 315/282; 315/200 R
(58) Field of Search ................. 315/209 R, 224, 315/226, 276, 282, 291, DIG. 7, 200 R, 219, 289

(56) References Cited

U.S. PATENT DOCUMENTS

| 3,987,339 | * | 10/1976 | Wroblewski | 315/278 |
|---|---|---|---|---|
| 4,009,387 | * | 2/1977 | Nuver | 250/205 |
| 4,240,009 | | 12/1980 | Paul | 315/224 |
| 4,777,409 | | 10/1988 | Tracy et al. | 315/200 R |
| 4,912,374 | * | 3/1990 | Nagase et al. | 315/244 |
| 5,155,415 | | 10/1992 | Schmidt et al. | 315/224 |
| 5,225,742 | * | 7/1993 | Beasley | 315/307 |
| 5,677,602 | * | 10/1997 | Paul et al. | 315/224 |
| 6,075,326 | * | 6/2000 | Nostwick | 315/307 |

* cited by examiner

Primary Examiner—Haissa Philogene
(74) Attorney, Agent, or Firm—Skjerven Morrill MacPherson LLP; Norman R. Klivans

(57) ABSTRACT

A driver circuit for a discharge lamp. A voltage source delivers a variable voltage to a constant current source which is connected to the lamp. The delivered voltage is varied to stabilize the supply of power to the lamp. The delivered voltage may be controlled in response to variations in lamp voltage.

7 Claims, 2 Drawing Sheets

DISCHARGE LAMP DRIVER CIRCUIT

BACKGROUND OF THE INVENTION

The present invention relates to a discharge lamp driver circuit.

High intensity discharge lamps (HID lamps) are arc lamps and do not have a physical filament as is the case with incandescent lamps. The HID lamp comprises a sealed envelope filled with xenon gas at a pressure above one atmosphere. The active volume of the lamp also includes within it mercury and other compounds (salts) which emit an intense light once an arc is established within the active volume of the lamp.

An HID lamp is approximately four time more efficient than alternative halogen lamps and produces a colour temperature similar to that of natural daylight. HID lamps are used for example in premium quality cars, floodlighting, architectural lighting and street lighting.

In order to light an HID lamp different conditions are required to initiate and then to maintain an arc. Firstly, a high voltage, typically up to 25000 volts, is required to establish the arc. Once the arc has been established, a power source must be connected to the lamp so as to maintain the arc. In conventional HID lamp driver circuits, the power source consists of two stages, that is a first stage to provide a high DC value and a second stage to convert this DC value into an AC voltage to maintain the arc. It is desirable to stabilise the power supply to the lamp by controlling the supplied voltage and/or current, and in order to achieve this conventional circuits require some form of computational capability so as to produce an output representing the product of the supplied voltage and current. As a result the conventional HID lamp driver circuits are relatively complex and expensive.

SUMMARY OF THE INVENTION

It is an object of the present invention to obviate or mitigate the problems outlined above.

According to the present invention, there is provided a driver circuit for a discharge lamp, comprising a constant current source for connection to the lamp, and a voltage source connected to the constant current source, the voltage source delivering a variable voltage to the constant current source, and means being provided to vary the delivered voltage to stabilise the supply of power to the lamp.

As a result of relying upon a constant current source, the power supply can be stabilised simply by appropriate control of the voltage delivered to the constant current source. The voltage applied to the lamp may be directly monitored and used to control the voltage source.

The constant current source may comprise a transformer an output winding of which is connected through a ballast capacitor to the lamp. A variety of different variable voltage sources may be used, for example a closed loop DC voltage supply circuit or an open loop DC voltage supply circuit.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Figure 1:
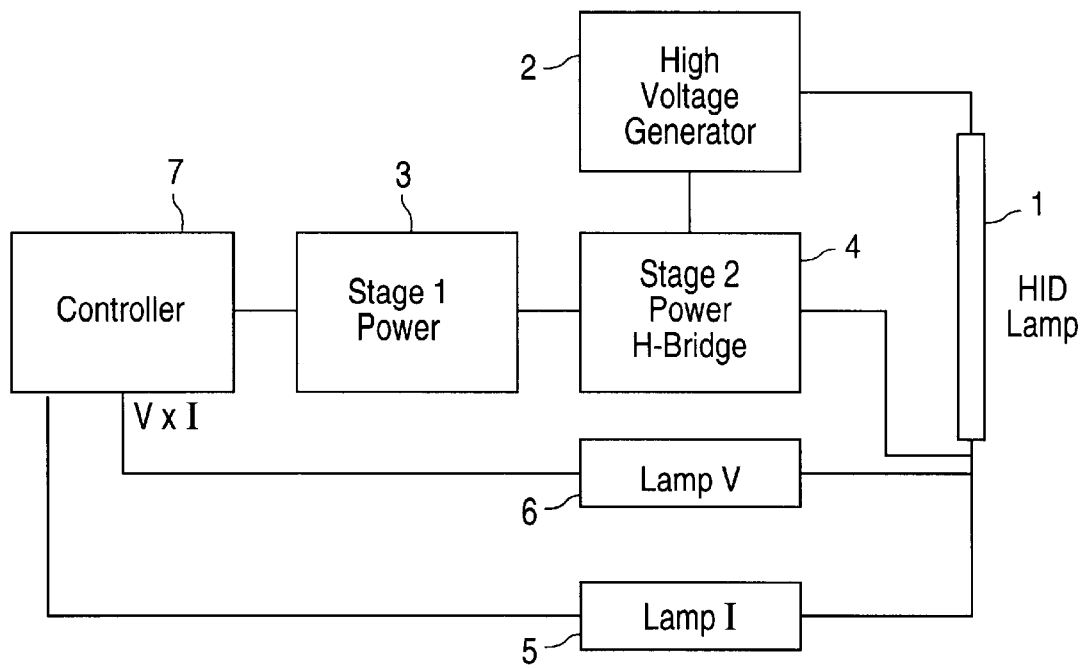
FIG. 1 is a schematic illustration of a conventional driver circuit for an HID lamp.

Referring to FIG. 1, a conventional driver circuit for an HID lamp is illustrated in block form. The lamp 1 is connected to a high voltage generator 2 and a two stage power supply, that is a first stage 3 and a second stage 4. Current through the lamp 1 is monitored by a circuit 5 and voltage through the lamp is monitored by a circuit 6. Outputs representative of the current and voltage are applied to a controller 7 which calculates the product of the monitored voltage and current and provides an output to the first stage power circuit 3.

The first stage power circuit 3 provides a high DC output and the second stage 4 converts this DC output Into an AC output. An arc is initially established in the lamp 1 by the high voltage generator 2, but once the arc is established the lamp current and voltage are controlled by the power circuits 3 and 4. In order to control the input power to the lamp 1 so as to maintain that power substantially constant, it is necessary for the controller 7 to compute the power on the basis of the monitored lamp voltage and current so as to provide an appropriate output to the first stage power circuit 3.

Figure 2:
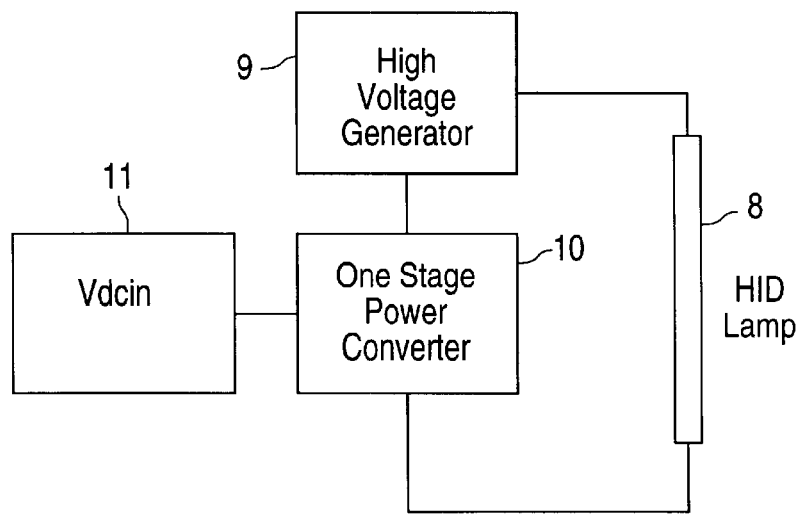
FIG. 2 is a schematic representation of components of a driver circuit in accordance with the present invention.
Figure 3:
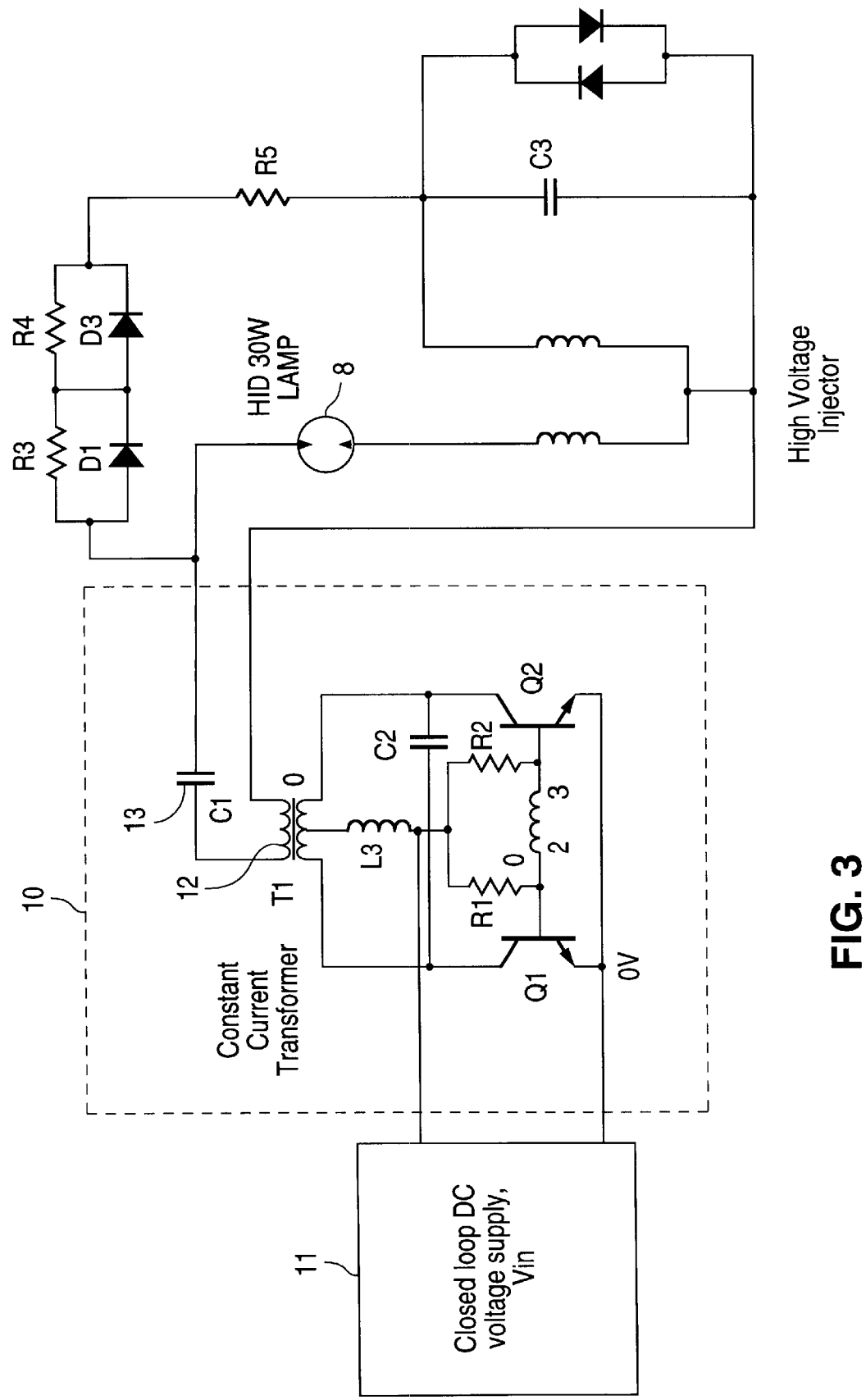
FIG. 3 is a more detailed circuit diagram of the arrangement illustrated in block form in FIG. 2.

Referring now to FIG. 2, this illustrates an embodiment of the present invention in block form. An HID lamp 8 is connected to a high voltage generator 9 and a single stage power converter 10 which is powered by a DC voltage supply circuit 11. FIG. 3 shows details of the high voltage generator which converts the output of the power converter 10 into sufficiently voltage to initiate an arc in the lamp 8. These components of the high voltage generator are essentially conventional and will not be described further.

The power converter 10 comprises an oscillator circuit coupled to a constant current transformer 12 an output winding of which is coupled via a ballast capacitor 13 to the lamp 8. The transformer 12 is wound so that in combination with the ballast capacitor 13 a pre-set constant current is established through the lamp 8 once the lamp arc has been established. As a result of this constant current characteristic, constant power can be achieved simply by varying the DC output voltage of the supply 11. This can be achieved without the need for circuits capable of monitoring both the lamp voltage and current and without the need for supplying relatively complex circuits and associated software capable of calculating the power by multiplying signals corresponding to the lamp current and voltage.

The voltage supply 11 can be of any convenient form, ranging from an open loop type (without feedback) to a full, closed loop control (with feedback). A switching type supply or linear regulator could be used. For automotive applications, it may be possible in some circumstances to take the supply voltage directly from a voltage regulator already provided for other purposes.

For more accurate power control in the lamp, the actual lamp voltage could be monitored and fed back to control the voltage supply 11 which feeds the constant current lamp ballast. All that is required is that the voltage supply 11 provides an output voltage which varies sufficiently to stabilise the lamp power.

The lamp voltage could be measured in any convenient manner, for example by relying upon another transformer, a hall effect device or any other suitable transducer.

What is claimed is:

1. A driver circuit for a discharge lamp, comprising:

a constant current source for connection to the lamp;

an oscillator circuit coupled to the constant current source;

a direct current voltage source coupled to the oscillator circuit and to the constant current source, the direct current voltage source delivering a variable voltage to the oscillator circuit and the constant current source; and means for varying the delivered voltage, thereby to stabilize the power supply to the lamp.

2. A driver circuit according to claim 1, wherein the constant current source comprises a transformer an output winding of which is connected through a ballast capacitor to the lamp.

3. A driver circuit according to claim 2 or 1, wherein the voltage source is a closed loop direct current voltage supply circuit.

4. A driver circuit according to claim 2 or 1, wherein the voltage source is an open loop direct current voltage supply circuit.

5. A driver circuit according to claim 1, wherein the means for varying the delivered voltage comprises means for monitoring the voltage applied to the lamp and means for controlling the delivered voltage to stabilize the monitored voltage.

6. A driver circuit for a discharge lamp, comprising:

a constant current source for connection to the lamp;

an oscillator circuit coupled to the constant current source;

a direct current variable voltage source coupled to the oscillator circuit and to the constant current source, the direct current variable voltage source delivering a variable voltage to the oscillator circuit and the constant current source.

7. A method for driving a discharge lamp, comprising the acts of:

providing a direct current voltage;

coupling the direct current voltage to an oscillator;

supplying a current to the discharge lamp, the supplied current varying in response to the oscillator and the direct current voltage; and varying the direct current voltage, thereby to stabilize the power supply to the discharge lamp.

* * * * *